United States Patent
Speier et al.

(10) Patent No.: US 7,353,319 B2
(45) Date of Patent: Apr. 1, 2008

(54) METHOD AND APPARATUS FOR SEGREGATING SHARED AND NON-SHARED DATA IN CACHE MEMORY BANKS

(75) Inventors: Thomas Philip Speier, Holly Springs, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 11/144,207

(22) Filed: Jun. 2, 2005

(65) Prior Publication Data

US 2006/0277356 A1 Dec. 7, 2006

(51) Int. Cl.
*G06F 12/06* (2006.01)
(52) U.S. Cl. .......................... 711/5; 711/130; 711/144; 711/147; 711/154; 711/156
(58) Field of Classification Search ................. 711/5, 711/130, 144, 147, 154, 156
See application file for complete search history.

(56) References Cited

U.S. PATENT DOCUMENTS

| | | | |
|---|---|---|---|
| 5,854,638 A * | 12/1998 | Tung | 345/542 |
| 5,943,686 A | 8/1999 | Arimilli et al. | |
| 7,174,415 B2 * | 2/2007 | Ironi et al. | 711/5 |
| 2002/0073280 A1 | 6/2002 | Ng | |
| 2003/0196041 A1 | 10/2003 | Sturges et al. | |

OTHER PUBLICATIONS

Lilja et al, "Improving Memory Utilization in Cache Coherence Directories," IEEE Transactions on Parallel and Distributed Systems, IEEE Service Center, Los Alamitos, CA, US, vol. 4, No. 10, Oct. 1, 1993, pp. 1130-1146, XP000432527, ISSN: 1045-9219.
Censier, et al, "A New Solution to Coherence Problems in Multicache Systems," IEEE Transactions on Computeres, IEEE Service Center, Los Alamitos, CA, US, vol. C-27, No. 12, 12/01/7, pp. 1112-1118, XP000611768, ISSN: 0018-9340.

\* cited by examiner

*Primary Examiner*—Stephen Elmore
(74) *Attorney, Agent, or Firm*—Joseph B. Agusta; Nicholas J. Pauley; Thomas Rouse

(57) ABSTRACT

In a multiprocessor system, accesses to a given processor's banked cache are controlled such that shared data accesses are directed to one or more banks designated for holding shared data and/or non-shared data accesses are directed to one or more banks designated for holding non-shared data. A non-shared data bank may be designated exclusively for holding non-shared data, so that shared data accesses do not interfere with non-shared accesses to that bank. Also, a shared data bank may be designated exclusively for holding shared data, and one or more banks may be designated for holding both shared and non-shared data. An access control circuit directs shared and non-shared accesses to respective banks based on receiving a shared indication signal in association with the accesses. Further, in one or more embodiments, the access control circuit reconfigures one or more bank designations responsive to a bank configuration signal.

22 Claims, 3 Drawing Sheets

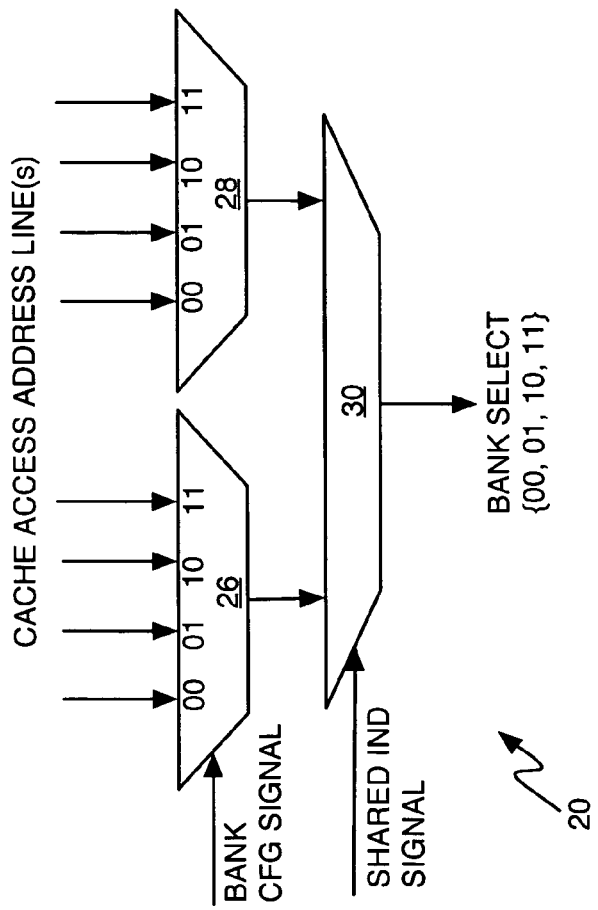
*FIG. 6*
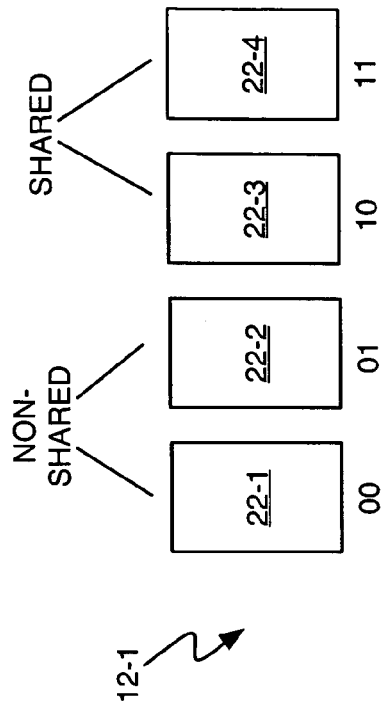
*FIG. 7*
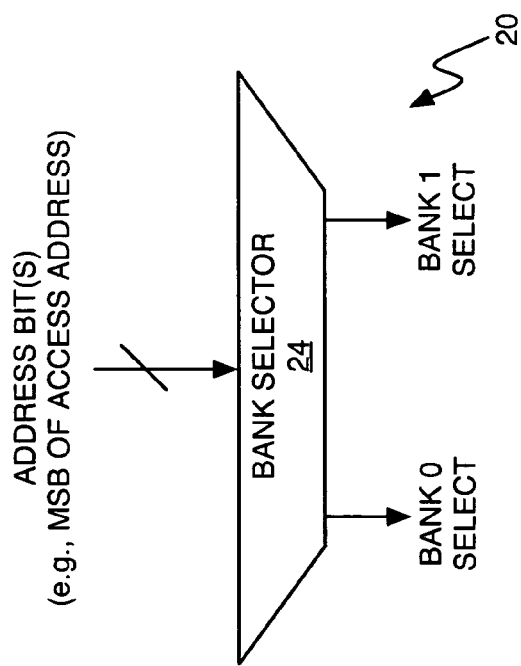
*FIG. 4*
*FIG. 5*

METHOD AND APPARATUS FOR SEGREGATING SHARED AND NON-SHARED DATA IN CACHE MEMORY BANKS

BACKGROUND

1. Field of the Invention

The present invention generally relates to microprocessors, and particularly relates to managing microprocessor caches.

2. Relevant Background

Higher performance microprocessors often use a hierarchical memory structure, including a base amount of main memory and one or more higher levels of smaller, faster cache memories in order to more closely match the speed of the memory to the processor speed. For example, Level 1 (L1) caches generally reside on-chip and represent the smallest, fastest cache available to the microprocessor. Level 2 (L2) caches reside on-chip or off-chip, and provide somewhat slower but typically larger amounts of cache memory than an L1 cache for the microprocessor. There may be additional levels of progressively slower (and larger) cache memories between the microprocessor and the main memory.

In operation, cache memory operates as a buffer between the microprocessor and the (comparatively) slow main memory, and is used to hold copies of the instructions and/or data that are most likely needed by the microprocessor. If a copy of a needed instruction or data item resides in the cache, the microprocessor reads/writes that copy instead of accessing the main memory and thereby avoids the potentially much longer access delays associated with the main memory access.

Caching operations become more complicated in multi-processor environments, where two or more microprocessors share memory space. In such environments, two or more microprocessors may cache the same data from main memory. That is, multiple microprocessors each may cache a copy of the same data item from main memory. To ensure that each microprocessor accesses the most recently updated value of a given data item, some method of synchronizing the caches among the microprocessors must be used. Cache synchronization maintains cache "coherency" by providing some mechanism to prevent the individual microprocessors from using a data item whose value has become outdated through the operations of the other microprocessors. Cache synchronization can be managed either by hardware-enforced coherency or by software through cache management instructions.

One type of hardware enforced cache coherency is a "broadcast" type approach. Broadcast based approaches to cache synchronization generally rely on each microprocessor transmitting messages related to data memory operations. In turn, the individual microprocessors, or their cache controllers, monitor ("snoop") those messages to determine whether the actions of another microprocessor have invalidated any data items held in their associated caches.

The use of these so-called "snoopy" buses thus represents a relatively straightforward and effective method of maintaining cache coherency in multiprocessor systems. However, snoopy buses can reduce the effective access bandwidth of cache memory, because the snoop traffic accesses to a given cache typically are supported on the same "port" or access bus that is used for locally generated cache accesses by the microprocessor(s). The amount of snoop traffic increases significantly as the microprocessor count increases and, eventually, the amount of snoop traffic can significantly limit overall system performance.

Various workarounds to the cache access interference problems posed by high volumes of snoop traffic include the use of multi-ported cache memory, where snoop traffic and locally generated traffic access the cache on different ports. However, such configurations can significantly increase the size, power consumption, and expense of the cache

SUMMARY OF THE DISCLOSURE

In at least one embodiment of a banked cache management method, interference between shared data cache accesses (e.g., cache accesses associated with snoop traffic) and non-shared data cache accesses is reduced by reducing or eliminating the mixing of shared data and non-shared data in at least one cache bank of the banked cache. Reducing or eliminating such mixing may comprise designating one or more banks of the banked cache for holding shared data, and directing cache accesses for shared data to the designated one or more cache banks. Additionally, or alternatively, such mixing can be reduced or eliminated by designating one or more banks of the banked cache for holding non-shared data, and directing cache accesses for non-shared data to the designated one or more cache banks.

For example, given cache accesses (read or write) are directed to particular cache locations in particular cache banks according to a "bank selection function," which may be driven at least in part by one or more cache access address signals. As used herein, the term "bank selection function" encompasses a variety of different methods and algorithms used to select a particular bank for a particular cache access address. For example, the term can cover address and/or other signal hashing functions or represent straightforward address decoding.

However the bank selection function is implemented, according to at least one embodiment of cache management as taught herein, an access type indicator (e.g., a shared access indicator) modifies the bank selection function, such that cache accesses for shared data and/or for non-shared data are directed (steered) to one or more designated banks in a banked cache. For example, the bank selection function may direct shared accesses to a shared access bank or to a mixed (shared and non-shared) access bank. Such action "focuses" cache access activity for shared data in the bank(s) designated for holding shared data. Similarly, the access type indicator may be used to modify the bank selection function to direct non-shared accesses to a non-shared access bank or to a mixed access bank, to focus cache access activity for non-shared data in the bank(s) designated for holding non-shared data. In both cases, the interference between shared data accesses and non-shared data accesses is reduced or eliminated, for at least one bank in the banked cache.

A broad method of reducing interference between shared data cache accesses and non-shared data cache accesses for at least one bank in a banked cache comprises designating one or more first banks of the banked cache for holding a first type of data, the first type of data being one of shared data and non-shared data, and directing cache accesses for the first type of data to the one or more first banks. The method may further comprise designating one or more second banks of the banked cache for holding a second type of data, said second type of data being the other one of shared and non-shared data, and directing cache access for the second type of data to the one or more second banks. Any or all such designations may be exclusive or non-exclusive (mixed).

One embodiment of a banked cache embodying the above method, or variations of the above method, comprises an access control circuit configured to reduce interference between shared data cache accesses and non-shared data cache accesses based on directing cache accesses for a first type of data to one or more first cache banks of the banked cache that are designated for holding the first type of data, the first type of data being one of shared data and non-shared data. The access control circuit further may direct cache accesses for a second type of data to one or more second cache banks of the banked cache, wherein the second type of data is the other one of shared and non-shared data.

In such embodiments, the access control circuit may be directly or indirectly responsive to the access type indicator, which may be a shared access signal provided to the banked cache in association with cache accesses. The logic state or value, or some other characteristic of the shared access indicator signal, indicates whether a given cache access is for shared (or non-shared) data, and the access control circuit's bank selection function is modified accordingly, to direct the cache access to the appropriate cache bank.

The bank selection function also may be modified according to a bank configuration signal. That is, the configuration of the banked cache may be changed as needed or desired, such that the designation of one or more banks as being for shared data, non-shared data, or mixed data, can be changed. Such changes may be controlled at the computer operating system level and/or controlled by individual programs running on the processor(s) associated with the banked cache.

BRIEF DESCRIPTION OF THE DRAWINGS

FIG. 4 is a block diagram illustrating one embodiment of an access control circuit for controlling banked cache accesses.

FIG. 5 is a block diagram illustrating a banked cache having an arrangement of non-shared and shared banks.

FIG. 6 is a block diagram illustrating another embodiment of an access control circuit for controlling banked cache accesses.

FIG. 7 is a block diagram illustrating a banked cache having another arrangement of non-shared and shared banks.

DESCRIPTION OF EMBODIMENTS OF THE INVENTION

Figure 1:
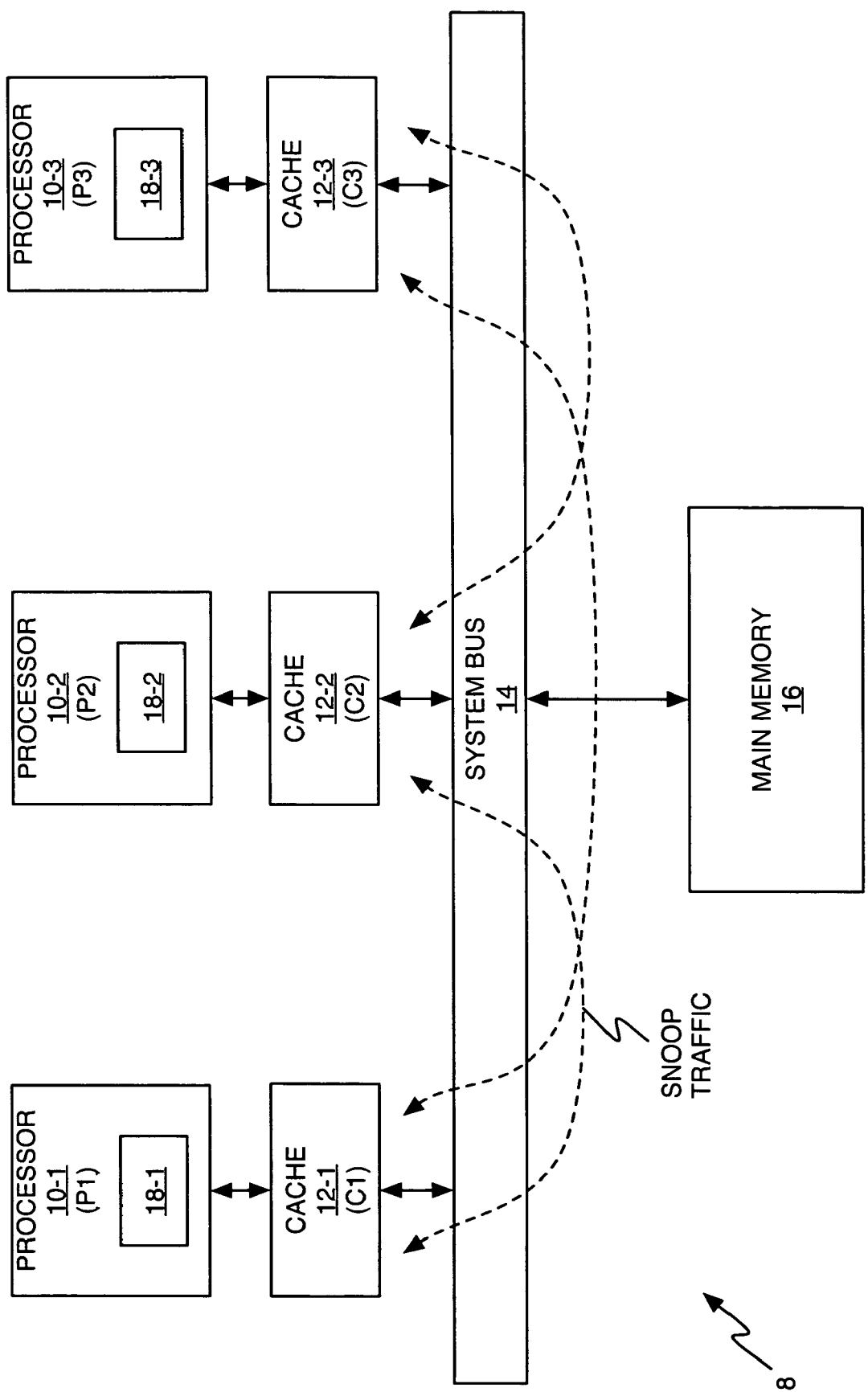
FIG. 1 is a block diagram illustrating a multiprocessor circuit that includes banked caches.

FIG. 1 at least partially illustrates a multiprocessor circuit 8, including a plurality of microprocessors 10 and associated memory caches 12 that are coupled through a system bus 14 to a main memory 16. The processors 10 may be implemented together, such as in one integrated circuit device, a system-on-a-chip circuit (multi-chip module), or may be implemented separately. Similarly, the cache memories 12 may be integrated in whole or in part into the processors 10, or may be implemented separately. For example, the cache 12-1 may include Level 1 (L1) cache that is included within processor 10-1 and Level 2 (L2) cache that is implemented internally or externally. The illustrated embodiment of the processor 10-1 includes a cache controller 18-1, which may include a number of memory management features. Similar configurations may be used for the processors 10-2 and 10-3, and for their corresponding caches 12-2 and 12-3.

Of course, the general physical implementations elected for the processors 10 and the caches 12 generally are not germane to the cache access control methods and apparatus discussed herein, and those skilled in the art will recognize the opportunity for various circuit implementation variations. For example, a greater or lesser number of processors 10 and corresponding caches 12 than are illustrated may be used as needed or desired.

With these variations in mind, the multiprocessor circuit 8 may operate as a Symmetric Multi-Processing (SMP) circuit, wherein the processors 10 cooperatively execute one or more computer programs, program threads, etc. The processors 10 each may comprise a Reduced Instruction Set Computer (RISC) processor, including a core unit having one or more instruction execution pipelines, and further including pre-fetch units for predictive caching of instructions and data, translation look-aside buffers to track memory mappings and permissions, etc. Also, as noted, each one of the processors 10 may further include a cache controller 18, which may comprise part of a larger memory management unit that interfaces the processor to a respective one of the caches 12, to the system bus 14, and to the main memory 16. Of course, each of the processors 10 may further comprise functional elements not illustrated, such as debug circuits, etc.

The main memory 16 may be configured with one or more ranges of "shared" memory used for holding data that may be operated on by any one or more of the processors 10, and one or more ranges of "non-shared" memory for use by particular ones of the processors 10. In that context, each one of the processors 10 may cache a mix of non-shared and shared data in a corresponding one of the caches 12. In one or more embodiments, at least one of the caches 12 is configured as a banked cache, comprising two or more cache banks. Preferably the different banks provide independent accessibility, such that accesses to one bank do not interfere with accesses to another bank.

Because of the need to maintain data coherency among the caches 12, the multiprocessing circuit 8 employs one or more forms of "broadcast" based data coherency protocols, also referred to as "snoopy" protocols. With snooping, operations by one of the processors 10 on cached copies of shared data are recognized by the remaining processors 10, so that appropriate cache flushing and/or main memory updates can be made to ensure that each one of the processors 10 operates on valid, current copies of that shared data.

By way of non-limiting example, the multiprocessing circuit's snooping protocol may be based on write broadcasting, wherein each one of the processors 10 and/or caches 12 send all writes onto the system bus 14 so that other processors/caches can update their respective cached data as needed. Alternatively, write invalidation protocols can be used, wherein writing to a given cache line in one of the caches 12, causes the same cache line present in any of the other caches 12 to be invalidated. (A "cache line" generally comprises a given data block cached from a particular address range in main memory.) Of course, other snooping protocols can be implemented for multiprocessing circuit 8, such as Modified-Shared-Invalid (MSI), Modified-Exclusive-Shared-Invalid (MESI), or Modified-Owner-Exclusive-Shared-Invalid (MOESI).

With one or more forms of snooping traffic flowing on the system bus 14, accesses to the caches 12 may include a significant amount of snoop traffic associated with maintaining shared data coherency across the caches 12. Additionally, each one of the processors 10 makes local accesses to both shared data and non-shared data held in its associated cache 12 to fulfill the requirements of the code executing on it. For example, accesses to cache 12-1 comprise a mix of snoop-related shared data accesses for maintaining data coherency, and local accesses by processor 10-1 carried out in association with its ongoing execution of program instructions. Conventionally, snoop-related and operational-related accesses to the same cache port, or to the same bank in a banked cache, compete with each other in terms of overall cache access bandwidth. In conventional systems, then, snoop traffic thus reduces the effective performance by competing with non-snoop cache accesses for the available cache memory bandwidth.

Figure 2:
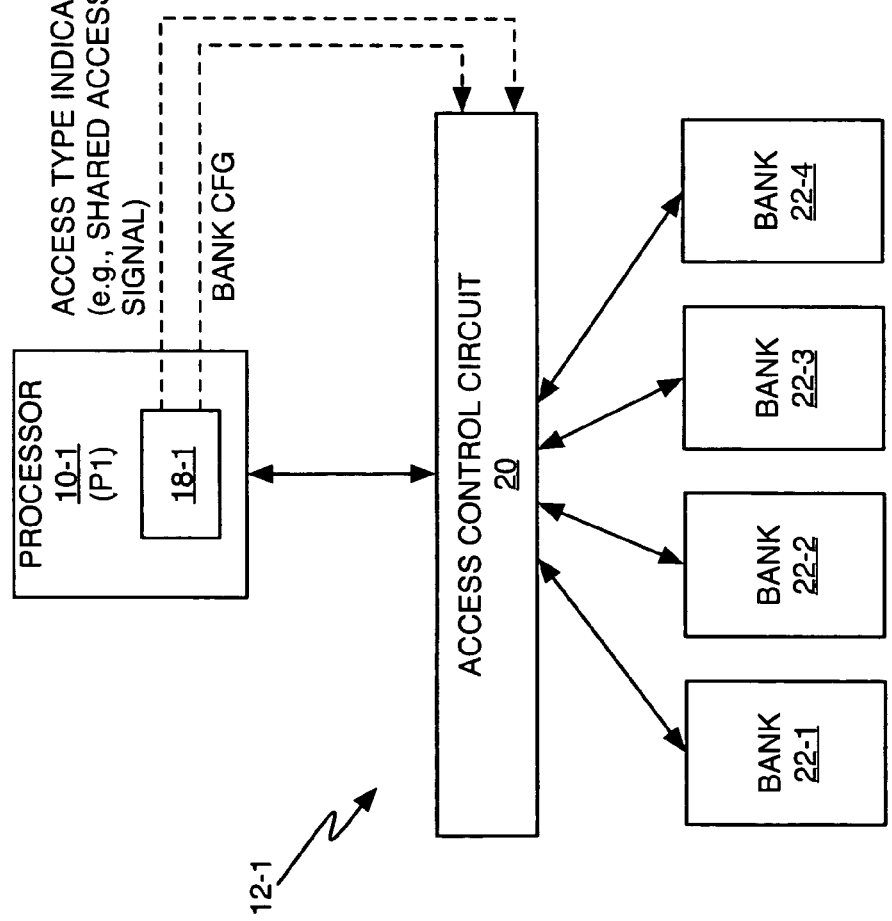
FIG. 2 is a block diagram illustrating a given one of the processors and banked caches in the multiprocessor circuit of FIG. 1.

FIG. 2 illustrates one embodiment of processor 10-1 (also referred to as "P1") and its associated cache 12-1. In the illustration, the banked cache 12-1 comprises an access control circuit 20, and four cache banks 22-1 through 22-4. A greater or lesser number of cache banks 22 may be implemented as needed or desired. Also, where the banked cache 12-1 comprises off-chip L2 cache, implementation of the access control circuit 20 as part of the banked cache 12-1 may be advantageous. However, in one or more embodiments, the access control circuit 20 is implemented on-board, as part of the processor 10-1. In such embodiments, the access control circuit 20 may be implemented as part of the cache controller 18-1.

In any case, in operation, the access control circuit 20 recognizes cache accesses as being related to non-shared data or shared data, and correspondingly directs those accesses according to non-shared/shared designations associated with the banks 22. In one or more embodiments, such recognition is based on the processor 10-1 providing a shared access indication signal and/or a bank configuration signal to the access control circuit. The same or similar configurations may be adopted for any one or more of processors 10-2 and 10-3 (i.e., P2, P3) and for their corresponding caches 12-2 and 12-3.

Regardless, each of the banks 22 within a given one of the banked caches 12 preferably is independently accessible, such that accesses to one of the banks 22 do not interfere with accesses to the remaining banks 22. With that cache configuration, one or more of the banks 22 can be designated for holding non-shared data, shared data, or a mix thereof.

If particular ones of the banks 22 are designated exclusively for holding non-shared data, then no snoop-related accesses associated with maintaining shared data coherency will interfere with local non-shared data accesses to those particular ones of the banks 22. Of course, particular ones of the bank 22 may be designated exclusively for holding shared data, or for holding a mix of shared and non-shared data. In general, different ones of the banks 22 can be designated for non-shared use, shared use, or mixed use, and a method of preserving local processor access bandwidth for at least one of the banks 22 comprises excluding shared data from that at least one bank. Directing shared and non-shared data accesses in this manner depends on the differing designations associated with particular ones of the banks 22.

More broadly, an embodiment of the access control circuit 20 can be configured to implement a method of reducing interference between shared data cache accesses and non-shared data cache accesses for at least one bank in a banked cache. For example, the access control circuit 20 may reduce such interference by designating one or more first banks 22 of the banked cache 12 for holding a first type of data, the first type of data being one of shared data and non-shared data, and directing cache accesses for the first type of data to the one or more first banks. Accesses may be recognized as targeting the first type of data based on the access type indicator provided to the access control circuit 12 in association with cache accesses.

The access control circuit 20 further may be configured to designate one or more second banks 22 of the banked cache 12 for holding a second type of data, the second type of data being the other one of shared and non-shared data, and directing cache access for the second type of data to the one or more second banks 22. In such embodiments, designating one or more first banks 22 of the banked cache 12 for holding the first type of data may comprise designating a first cache bank 22 for holding shared data. Similarly, designating one or more second cache banks 22 for holding a second type of data may comprise designating a second cache bank 22 for holding non-shared data.

With such an arrangement, cache accesses for the first type of data are directed to that first one of the cache banks 22, and cache accesses for non-shared data are directed to that second one of the cache banks 22. Note, too, that one or both such designations can be exclusive, such that all shared and/or non-shared accesses are exclusively directed to one or more designated banks 22 in the banked cache 12. However, the designations also can be non-exclusive, such that both shared and non-shared accesses are directed to the same bank, at least for a given range of cache addresses. Even where a given one of the cache banks 22 is designated as a mixed bank, the amount or percent of that bank used for shared or non-shared data can be controlled, e.g., it can be primarily used for shared or non-shared data, such that access interference in that bank for the non-primary type of data is minimal.

The access type indicator may be a signal or other type of value that is set under software control. For example, the access type indicator may comprise a bit in a page table within a microprocessor 10 that is written by software, such that the hardware (e.g., processor 10) has access to the indicator after performing a page table lookup based on a given memory address. In another embodiment, the access type indicator may comprise the results of an address decode/comparison against some software-written configuration register(s) within the processor 10. For example, software can configure two registers to indicate a shared region start and end, and a processor 10 can set the access type indicator signal to the appropriate state by comparing all or a portion of an access address against those registers to determine if a given access is shared or not.

In still another embodiment, a software programmed register within the processor 10 is used to indicate whether a certain type of access is shared or not, and the state or value of that register thus serves as the access type indicator signal. The shared/non-shared determination can be based on the software's knowledge of what types of accesses are able to access which regions of memory. Such an arrangement may be useful for accesses associated with cache management operations, translation-lookaside-buffer (TLB) management operations, and other specialized functions, such as data streaming, etc.

Figure 3:
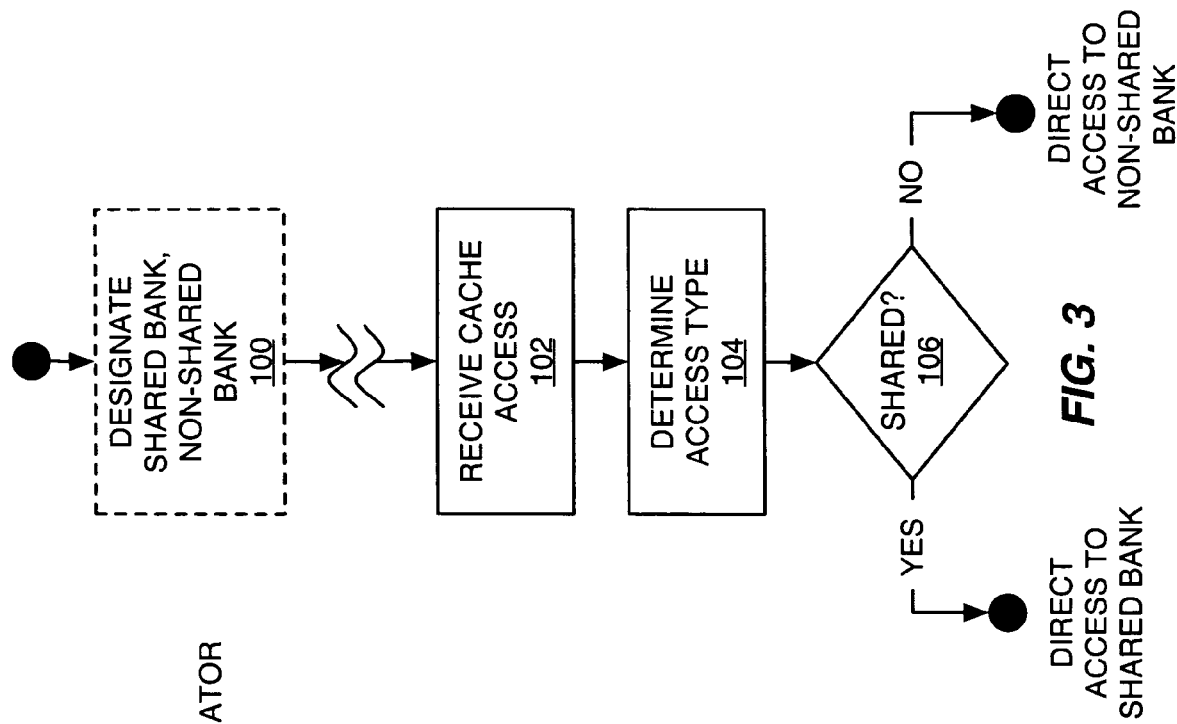
FIG. 3 is a logic flow diagram illustrating one embodiment of controlling banked cache accesses as a function of non-shared/shared data access types.

Regardless, with the above shared/non-shared access-directing methods in mind, FIG. 3 illustrates processing logic that can be implemented in support of directing shared and non-shared accesses, and begins with designating particular ones of the banks 22 in any one or more of the caches 12 as being shared or non-shared (Step 100). This step may be an implicit step, such as where the banked caches 12 are configured with predefined shared and non-shared bank designations, or may be an explicit step in embodiments where the bank designations are configurable.

Assuming that the desired designations are made, processing continues by making a cache access (Step 102), and determining the access type as shared or non-shared (Step 104). If the access is for shared data (yes at Step 106), it is directed to one of the banks 22 designated as holding shared data. Conversely, if the access is for non-shared data (no at Step 106), it is directed to one of the banks 22 designated for holding non-shared data.

FIG. 4 illustrates one embodiment of the access control circuit 20, comprising a bank selector circuit 24 that is configured to direct cache accesses to non-shared or shared banks 22 based on "hashing" one or more address bits generated for the cache accesses. For example, with two banks 22, one or more address lines can be used to generate a "BANK 0" select signal or a "BANK 1" select signal, corresponding to shared or non-shared accesses, respectively. FIG. 5 illustrates two such selectively accessed banks 22.

Similarly, FIGS. 6 and 7 respectively illustrate another embodiment of the access control circuit 20, and a corresponding example of shared and non-shared bank designations. More particularly, the embodiment of the access control circuit 20 illustrated in FIG. 6 directs non-shared and shared data cache accesses as a function of hashing one or more address lines and a shared access indication signal and, optionally, a bank configuration signal. The shared access indicator signal may comprise one or more bits, and can be asserted according to positive or negative logic, to indicate that a given cache access is for a cache line that maps to a shared or a non-shared region of main memory. Such a shared indication can be readily generated as a function of memory page information stored for the processor's use. Like the shared indication signal, the bank configuration signal can be one or more bits, and can be processor-generated.

With the processor 10-1 serving as an example, the cache controller 18-1 can be configured to generate the shared indicator signal and/or the bank configuration signal to support operation of the access control circuit 20. Where desired, the cache controller 18-1 can be configured to update the bank configuration signal dynamically, responsive to remapping of the main memory 16, for example, or responsive to different operating system or program modes. In such instances, the cache controller 18-1 can be configured to flush or otherwise invalidate or clear the banked cache 12-1 as part of reconfiguring the shared/non-shared bank designations. Those skilled in the art will appreciate that similar configurations may exist in any one or more of the processors 10-2 and 10-3, the cache controllers 18-2 and 18-3, and the banked caches 12-2, and 12-3.

Of course, those skilled in the art should appreciate that the discussion herein relates to various illustrative embodiments and does not limit the present invention, nor do the accompanying figures. Rather, the present invention is limited only by the following claims, and their legal equivalents.

The invention claimed is:

1. A method of reducing interference between shared data cache accesses related to cache snoop traffic in a multi-processor system and non-shared data cache accesses directed to data exclusive to an accessing processor for at least one bank in a banked cache, the method comprising:
    designating one or more first banks of the banked cache for holding a first type of data, said first type of data being one of shared data and non-shared data; and
    directing cache accesses for the first type of data to the one or more first banks.

2. The method of claim 1, further comprising designating one or more second banks of the banked cache for holding a second type of data, said second type of data being the other one of shared and non-shared data, and directing cache access for the second type of data to the one or more second banks.

3. The method of claim 2, wherein designating one or more first banks of the banked cache for holding a first type of data comprises designating a first cache bank of the banked cache for holding shared data, and wherein designating one or more second cache banks for holding a second type of data comprises designating a second cache bank of the banked cache for holding non-shared data.

4. The method of claim 3, wherein directing cache accesses for the first type of data to the one or more first banks comprises directing cache access for shared data to the first cache bank, and further comprising directing cache accesses for non-shared data to the second cache bank.

5. The method of claim 1, further comprising designating one or more second banks of the banked cache for holding a second type of data, said second type of data being the other one of shared and non-shared data, and directing cache access for the second type of data to the one or more second banks.

6. The method of claim 1, wherein designating one or more first banks of the banked cache for holding a first type of data comprises designating at least one bank of the banked cache exclusively for holding the first type of data.

7. The method of claim 1, wherein designating one or more first banks of the banked cache for holding a first type of data comprises designating at least one bank of the banked cache for holding a mix of the first type of data and a second type of data, said second type of data being the other one of shared and non-shared data.

8. The method of claim 1, wherein directing cache accesses for the first type of data to the one or more first banks comprises configuring a bank selection function to be responsive to an access type indicator signal that indicates whether a cache access is for the first type of data.

9. The method of claim 8, wherein configuring a bank selection function to be responsive to an access type indicator that indicates whether a cache access is for the first type of data comprises configuring the bank selection function to direct a given cache access to a particular location or locations in a particular bank of the banked cache as a function of one or more cache access address signals and the access type indicator signal.

10. The method of claim 1, wherein designating one or more first banks of the banked cache for holding a first type of data comprises configuring a bank selection function used to direct cache accesses to a particular bank in the banked cache to be responsive to an access type indicator signal that indicates whether an individual cache access involves the first type of data.

11. The method of claim 10, further comprising reconfiguring the bank selection function as needed to change the designations of the one or more first banks of the banked cache.

12. The method of claim 11, further comprising flushing currently cached data from the one or more first banks of the banked cache responsive to changing the designations.

13. A method of reducing cache access interference in a banked cache between cache accesses for shared data related to cache snoop traffic in a multi-processor system and cache accesses for non-shared data that is exclusive to an accessing processor, the method comprising:
   reducing or eliminating a mixing of shared and non-shared data in at least one cache bank of the banked cache; and
   directing cache accesses related to one of shared or non-shared data to at least one cache bank in which the other of shared or non-shared data has been reduced or eliminated.

14. The method of claim 13, wherein reducing or eliminating a mixing of shared and non-shared data in at least one cache bank of the banked cache comprises designating one or more banks of the banked cache for holding shared data, and directing cache accesses for shared data to the designated one or more cache banks.

15. The method of claim 13, wherein reducing or eliminating a mixing of shared and non-shared data in at least one cache bank of the banked cache comprises designating one or more banks of the banked cache for holding non-shared data, and directing cache accesses for non-shared data to the designated one or more cache banks.

16. A banked cache comprising an access control circuit configured to reduce interference between shared data cache accesses related to cache snoop traffic in a multi-processor system and non-shared data cache accesses directed to data exclusive to an accessing processor by directing cache accesses for a first type of data to one or more first cache banks of the banked cache that are designated for holding the first type of data, said first type of data being one of shared data and non-shared data.

17. The banked cache of claim 16, wherein the access control circuit is configured to direct cache accesses for a second type of data to one or more second cache banks of the banked cache, wherein the second type of data is the other one of shared and non-shared data.

18. The banked cache of claim 17, wherein the access control circuit is configured to determine whether a given cache access is for the first or second types of data based on an access type indicator signal that is provided to the banked cache in association with the given cache access.

19. The banked cache of claim 16, wherein the access control circuit is configured to implement a bank selection function based on receiving an access type indicator signal in association with cache accesses, and wherein the access control circuit is configured to direct a given cache access to the one or more first cache banks if the access type indicator signal indicates that the given cache access is for the first type of data.

20. The banked cache of claim 16, wherein at least one of the one or more first cache banks is designated exclusively for holding data of the first type.

21. The banked cache of claim 16, wherein at least one of the one or more first cache banks is designated non-exclusively for holding data of the first type.

22. The banked cache of claim 16, wherein the access control circuit is configurable to allow changing the designation of the one or more first cache banks.

* * * * *